April 29, 1924.
W. C. KENNEDY
1,492,326
TIRE RIM CONTRACTING AND EXPANDING TOOL
Filed Feb. 17, 1921     2 Sheets-Sheet 1
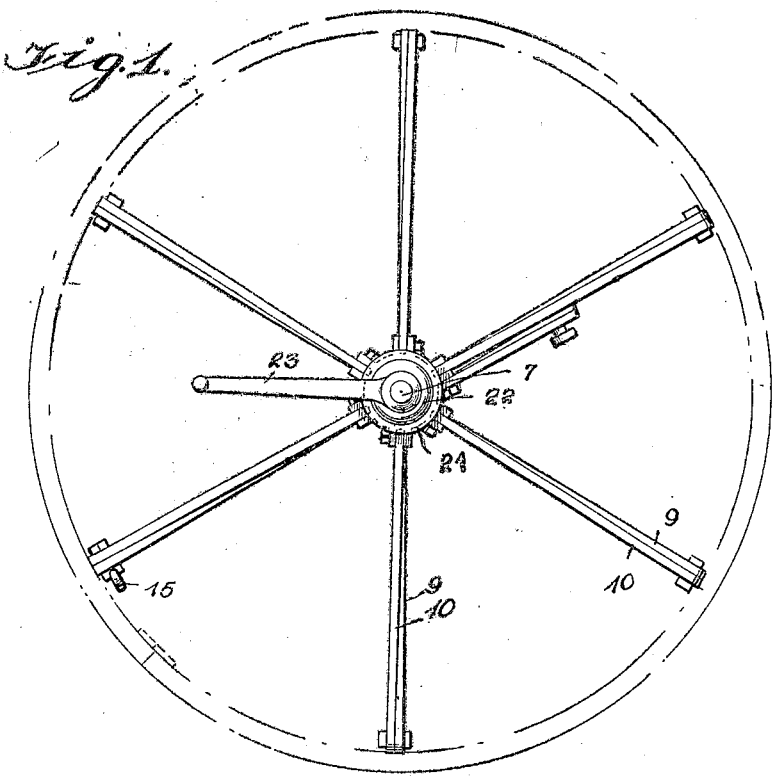
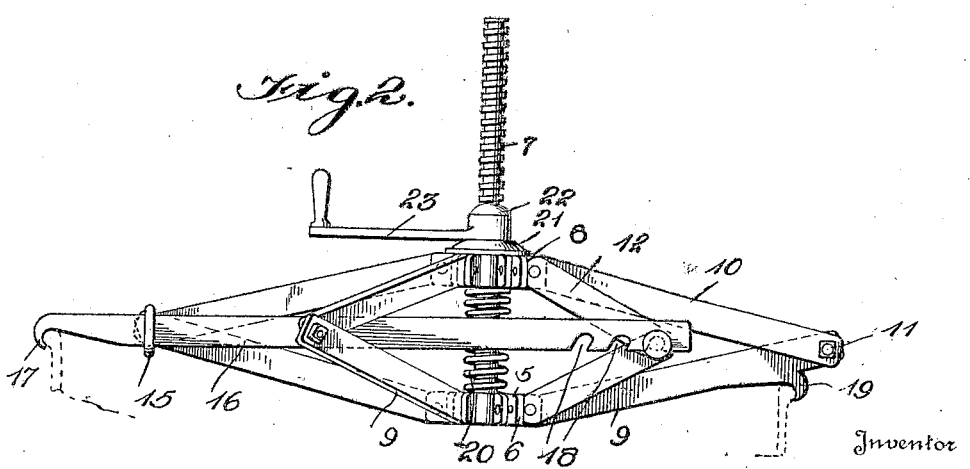
Inventor
Walter C. Kennedy
By Norman T. Whitaker
his Attorney

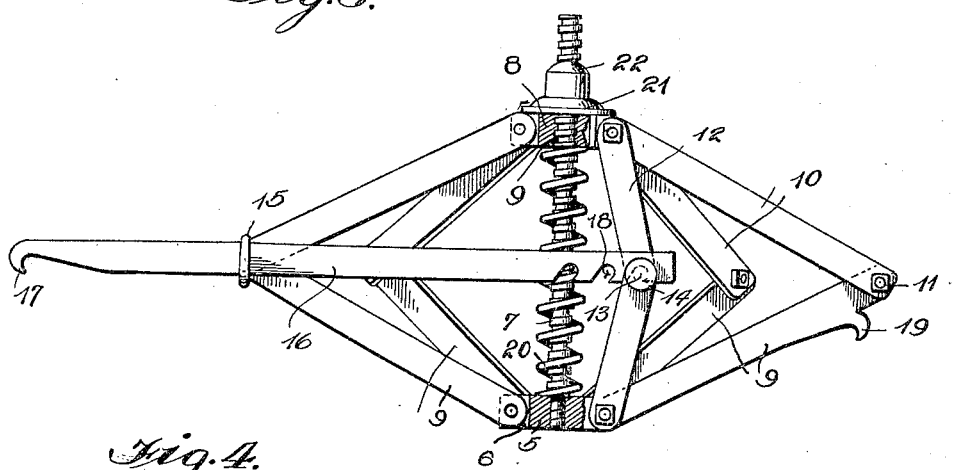
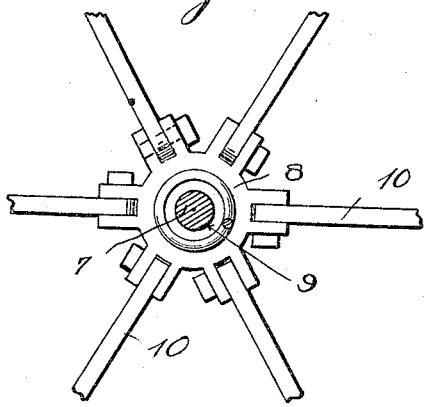
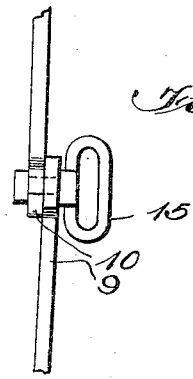
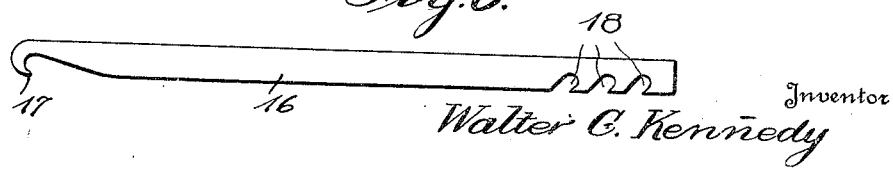

Patented Apr. 29, 1924.

1,492,326

UNITED STATES PATENT OFFICE.

WALTER C. KENNEDY, OF LEWISTON, IDAHO; VIVIAN J. KENNEDY EXECUTRIX OF SAID WALTER C. KENNEDY, DECEASED.

TIRE-RIM CONTRACTING AND EXPANDING TOOL.

Application filed February 17, 1921. Serial No. 445,656.

*To all whom it may concern:*

Be it known that I, WALTER C. KENNEDY, a citizen of the United States, and a resident of Lewiston, in the county of Nez Perce and State of Idaho, have invented a new and useful Tire-Rim Contracting and Expanding Tool, of which the following is a specification.

My invention relates to pneumatic tire rim contracting and expanding tools and its primary object is to provide a tool of this character which is simple in operation and will quickly expand or contract the tire rim for the purpose of applying or disengaging a pneumatic tire therefrom.

A further object of the invention is to provide a tire tool which is capable of both expanding and contracting the rim and which, at the same time, may be operated with little effort.

It is also an object of the present invention to provide a tire rim contracting and expanding tool which is adjustable to rims of various diameters.

The invention further provides a device of this character wherein one of its elements is removable and may be used as a pry for facilitation of the disengagement of the tire from the rim.

With the preceding and other objects and advantages in mind, the invention consists in the novel combination of elements, construction and arrangement of parts and operations to be hereinafter more fully described, claimed and illustrated in the accompanying drawings, wherein:

Figure 1 is a plan view of the tool engaged with the rim for expanding the latter, the rim being indicated in broken lines;

Figure 2 is a side elevation of the tool engaged with the rim for contracting or breaking the same;

Figure 3 is a view partly in elevation and partly in section illustrating the device in extended position and ready to be engaged with the rim for the contracting operation;

Figure 4 is a fragmentary detail view, parts being shown in cross section;

Figure 5 is a fragmentary detail elevation of the tool; and

Figure 6 is a side elevation of the prying implement detached from the tool.

Referring in detail to the drawings wherein similar characters of reference designate similar parts throughout the several views, the numeral 5 designates a head or circular member provided with pairs of radially disposed ears 6. Fixed to the head or circular member 5 and extending vertically therefrom is a threaded stem 7. The numeral 8 designates a member identical to the part 5 and is provided with a central opening 9 through which the stem 7 extends, this member 8 being adapted for longitudinal movement on the stem 7.

Radially and angularly disposed links 9 are pivoted between the ears 6 of the member 5 while links 10 are pivotally connected with the ears of the member 8 and are arranged in the same relation with respect to this member 8 as the links 9 are arranged with respect to the member 5. Each of the links 9 is pivotally connected at its outer end with the outer end of one of the links 10 as indicated at 11.

As is clearly shown in Figures 2 and 3, the outer ends of the links 11 are rounded so that a larger bearing surface, for engagement with the inner face of the tire rim to be expanded, is attained.

A pair of short links is designated at 12 and have their outer ends pivotally connected with the member 5 and member 8 respectively, while their inner ends are pivotally connected through the medium of a pivot pin 13 which extends laterally from these links and is formed with a head 14. Carried by the outer end of that link 9 which is disposed diametrically opposite the links 12 and extending laterally therefrom is a loop 15. Adapted for longitudinal movement through the loop 15 is a bar 16 carrying, at its outer end, a cant or hook 17 adapted for engagement with one of the flanges of the tire rim during the contracting operation. This bar 16 is formed with, in one of its longitudinal edges and at its inner end, a plurality of notches 18, any one of which being adapted to engage the outstanding end of the pivot pin 13.

It will be seen that by the provision of these notches 18 and the loop 15, the bar 16 may be adjusted longitudinally to adapt the device to various sized rims. For cooperation with the hook 17, a hook 19 is formed on, and adjacent the outer end of the link 9 disposed diametrically opposite the loop 15.

Encircling the stem 7 is an expansible coil spring 20, the lower end of which abuts the member 5, while its opposite end engages the member 8 and normally urges the same upwardly. Slidably received on the stem 7 and engaging the upper face of the member 8 is a disk or follower 21. A nut 22 is threaded on this stem 7 and carries a laterally disposed crank handle 23, upon rotation of which in one direction, the member 8 will be moved downwardly. In order to break or contract the rim the hooks 17 and 19 are engaged with the latter and the handle 23 rotated to move the nut 22 downwardly which forces the member 8 downwardly. This causes the links 12 to move from the position shown in Figure 3 to that shown in Figure 2 and thereby draws the bar 16 inwardly through the loop 15.

When it is desired to expand the rim, the bar 16 is disengaged from the device and the device placed in the position shown in Figure 1 with the rounded corners of the links 9 and 10 engaging the inner face of the rim. Now, upon rotation of the crank handle 23 the member 8 will be forced downwardly as previously stated, which causes the outer ends of the links 9 and 10 to move outwardly against the outer face of the rim and force the same into its normal position. When the bar 16 is not in use, it may be used to pry the tire-shoe from the rim.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. A device of the character described comprising a stationary member, a stem extending at right angles thereto, an element slidably mounted on the stem, pairs of links pivoted to the slidable element and stationary element respectively and pivotally connected at their outer ends, the outer ends being adapted to engage the inner face of a tire rim, means mounted on the stem for moving the slidable element toward the stationary element whereby the outer ends of the links are forced against the rim, a pair of relatively short links pivotally connected and pivotally connected with the slidable and stationary members, a loop carried by one pair of links which is disposed diametrically opposite the short links, a pin extending laterally from the short links, a bar slidably extending through the loop and provided with a plurality of notches, any one of which being adapted to engage the pin, a hook carried by the outer end of the bar adapted for engagement with the rim when the latter is to be contracted, and a hook carried by one of the links disposed diametrically opposite the loop and also adapted for engagement with the rim.

2. A tire rim contracting an expending tool comprising a stationary member, a screw-threaded stem carried thereby and extending at right angles thereto, a member slidably mounted on said stem, means on the stem for moving the slidable member toward the stationary member, pairs of links pivotally connected and pivotally connected to the stationary and slidable members, a hook carried by one pair of links and a loop carried by another pair of links, the hook being diametrically opposite said loop, the pivotally connected ends of the links being adapted to engage the inner face of a tire rim whereby the rim may be expanded, a pair of relatively short links pivotally connected and pivotally connected to the stationary member and slidable member, a pin extending through the short links, a bar slidably extended through the loop and provided with a plurality of notches to engage the pin and a hook carried by the outer end of the bar adapted for engagement for the rim whereby the rim may be contracted.

WALTER C. KENNEDY.